Feb. 9, 1960 J. GRAMBOW 2,924,662
BROADCASTING RECEIVER
Filed Dec. 17, 1957
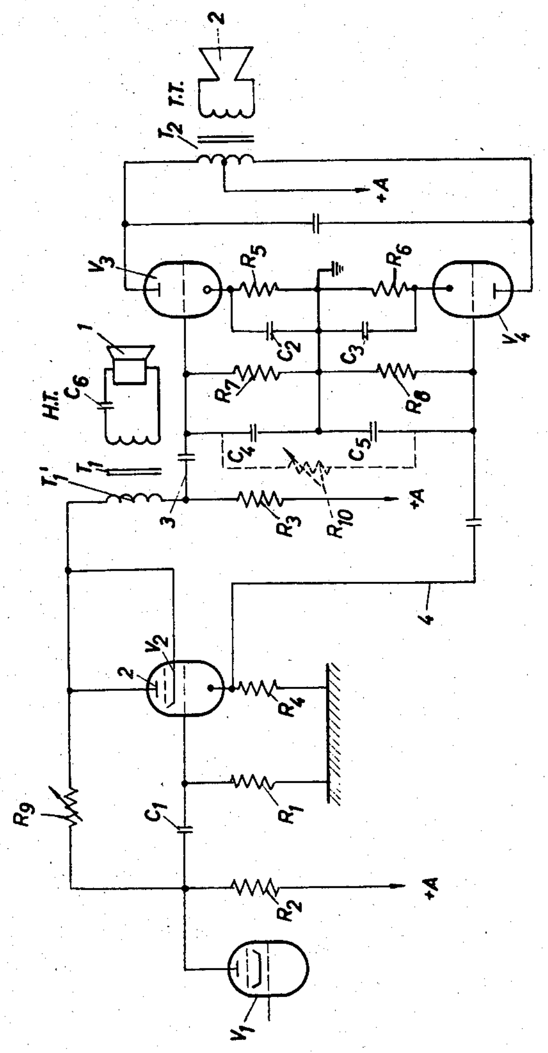
INVENTOR
J. Grambow
BY R P Morris
ATTORNEY 2,924,662
Patented Feb. 9, 1960

2,924,662

BROADCASTING RECEIVER

Joachim Grambow, Eutingen, Baden, Germany, assignor to International Standard Electric Corporation, New York, N.Y., a corporation of Delaware Application December 17, 1957, Serial No. 703,299

Claims priority, application Germany December 19, 1956

4 Claims. (Cl. 179—1)

This invention relates to a two-channel amplifier employing a push-pull stage, more particularly for use in broadcasting receivers.

For reproducing an electromagnetically transmitted low-frequency band with the entire frequency spectrum thereof, and with the best possible fidelity of reproduction, "tweeter" loudspeakers are often used for the reproduction of the high frequencies, and "woofers" or medium frequency loudspeakers for the medium and low frequencies, or else the so-called main speakers. The different frequency ranges are then divided usually at a point between 600 and 800 c./s. For auditory reasons and for reasons related to the power consumption of the loudspeaker, the low frequencies, particularly the bass frequencies, require a substantially higher power amplification than the high frequencies (e.g. in the ratio 10:1). It is well-known to feed the medium and/or low frequencies via a channel comprising a push-pull stage to the woofer (bass loudspeaker) or main speaker, and the high frequencies via another channel to the tweeter loudspeaker, in which case the last-mentioned channel comprises a special diode, which is separate from the push-pull stage, and is adapted to act as an output tube. This arrangement requires a number of additional circuit elements, including tubes. Apart therefrom there appears in such arrangement an effect which is commonly known as intermodulation, in which the high sounds are modulated with the low ones, so that the high frequencies are reproduced in a poor manner. Finally there results the disadvantage of requiring two output systems.

All of the aforementioned disadvantages are removed by the present invention, which is characterized by the fact that the phase inverter tube for the push-pull stage comprises a power amplifier tube connected with respect to the high audio frequencies as an output stage with preferably a moderate degree of negative feedback and, at the same time, with respect to the low frequencies as a phase inverter tube for the push-pull output stage.

With respect to the design of push-pull output amplifiers as such, there exist quite a number of different circuits. Thus, for the preliminary stage of the push-pull output amplifier there is used in many cases no further push-pull arrangement, but the balancing of the input voltage for the push-pull arrangement is carried out with the aid of a transformer. Further, there are also known arrangements in which the input voltage is balanced to ground with the aid of a so-called phase inverter arrangement in which, to this end, there is used one single tube with an external resistance, the one half of which is applied between anode and current source, and the other half between cathode and current source. According to the invention, however, the phase inverter tube is employed in a special manner for the amplification of the high audio frequencies, so that it operates as a phase inverter tube for the push-pull output stage of the woofer channel as well as, at the same time, an output amplifier tube for the tweeter channel.

One embodiment of the invention will now be described with reference to the accompanying circuit drawing.

The voltages as amplified by the tube $V_1$ are applied via the coupling condenser $C_1$ and the grid resistance $R_1$ to the tube $V_2$. The tube $V_1$ is supplied in the conventional manner with anode D.C. voltage from the source of anode voltage +A via the resistor $R_2$. Unlike the conventional types of phase inverter tubes, the tube $V_2$ is a power amplifier tube, e.g. of the type EF80. In the anode circuit of the tube $V_2$ there is inserted the winding $T_1'$ of the transformer $T_1$ for the tweeter loudspeaker 1. In series with the winding $T_1'$, and between the anode 2 and the source of anode voltage +A there is arranged the resistor $R_3$. Instead of a series connection for the winding $T_1'$, there may be provided a parallel arrangement. Between the cathode of tube $V_2$ and ground, there is inserted the resistor $R_4$. For obtaining a phase shift of the voltage by 180° for the push-pull arrangement, the resistances of $R_3$ and $R_4$ should have the same value. It has been found that particularly favourable operation results when the resistances each have a value ranging between 2 and 0.5 kilohms (instead of the customary value of e.g. 20 kilohms). The lead 3 branches off at the junction point between resistor $R_3$ and winding $T_1'$ and lead 3 at the junction between the cathode of tube $V_2$ and resistor $R_4$. The leads 3 and 4 are coupled to the respective control grids of the two tubes $V_3$ and $V_4$ forming part of a conventional type of push-pull arrangement. $R_5$ and $R_6$ are the cathode resistances of these tubes, $C_2$ and $C_3$ are the bridging condensers of the cathode resistances, and $R_7$ and $R_8$ are the grid resistances. The bass loudspeaker or woofer 2 is coupled via the transformer $T_2$ into the common anode circuit of the tubes $V_3$ and $V_4$ of the push-pull arrangement.

The amplification of the high audio frequencies is effected in such a way that the tube $V_2$ operates for these frequencies as a power amplifier, because the push-pull arrangement, due to the condensers $C_4$ and $C_5$, which are connected in parallel with the arrangement, represents a short-circuit with respect to the high frequencies. In addition thereto, and due to the unbridged cathode resistance $R_4$, there exists a negative feedback for the high frequencies. If so required, the resistor $R_4$ may be bridged by a suitably dimensioned condenser depending on the degree of negative feedback desired. With the aid of the variable resistance $R_9$ connected between the grid and the anode of the power amplifier tube $V_2$, there may be effected a regulation or control of the high audio frequencies.

With respect to the low audio frequencies, the winding $T_1'$ presents substantially no resistance; any low frequencies which might enter the secondary circuit of the transformer $T_1$ will be kept away from tweeter loudspeaker 1 by the condenser $C_6$ in this circuit, or will be at least weakened to such an extent as to be practically ineffective. The entire anode voltage drop for the low frequencies practically appears at the resistances $R_3$ and $R_4$, and with respect to these frequencies the tube $V_2$ acts as a phase inverter tube, because on one hand the resistances $R_4$ and $R_3$ have the same values and because, on the other hand, the condensers $C_4$ and $C_5$ are so dimensioned as to no longer represent a short-circuit to the low frequencies, so that the voltages of the low audio frequencies, which are phase-shifted by 180°, are applied to the grids of the tubes of the push-pull arrangement. If required, a special regulation or control may be provided for the low audio frequencies e.g. with the aid of the variable resistance $R_{10}$, which bridges the two condensers $C_4$ and $C_5$.

While I have described above the principles of my invention in connection with specific apparatus, it is to be clearly understood that this description is made only by way of example and not as a limitation to the scope of my invention.

What is claimed is:

1. An amplifier circuit arrangement for energizing two load circuits having different frequency characteristics comprising: an inverter amplifier for producing from a source of high and low frequency voltage two output voltage sources of opposite phase; a first load circuit selective to high frequency currents; a second load circuit selective to low frequency currents; a push-pull amplifier having input and output circuits; a first means connecting said first load circuit to one phase of said output voltage sources of opposite phase and a second means connecting said second load circuit to both of said output voltage sources of opposite phase through said push-pull amplifier input and output circuits.

2. An amplifier circuit arrangement in accordance with claim 1 wherein said first connecting means comprises means for passing low frequency currents to the input circuits of said push-pull amplifier and said second connecting means comprises means for passing high frequency currents to said first load circuit.

3. An amplifier circuit arrangement in accordance with claim 1 wherein said first and second load circuits comprise resepctively a loud speaker essentially responsive to frequencies in the upper audio range and a loud speaker essentially responsive to frequencies in the lower voice range.

4. An amplifier arrangement in accordance with claim 3 further comprising a variable resistance connected across the input circuits of said push-pull amplifier to regulate the amplitude of voltages applied thereto.

No references cited.